Nov. 8, 1932.  F. W. EDWARDS ET AL  1,886,659
LUBRICATOR
Filed Sept. 10, 1928   3 Sheets-Sheet 3
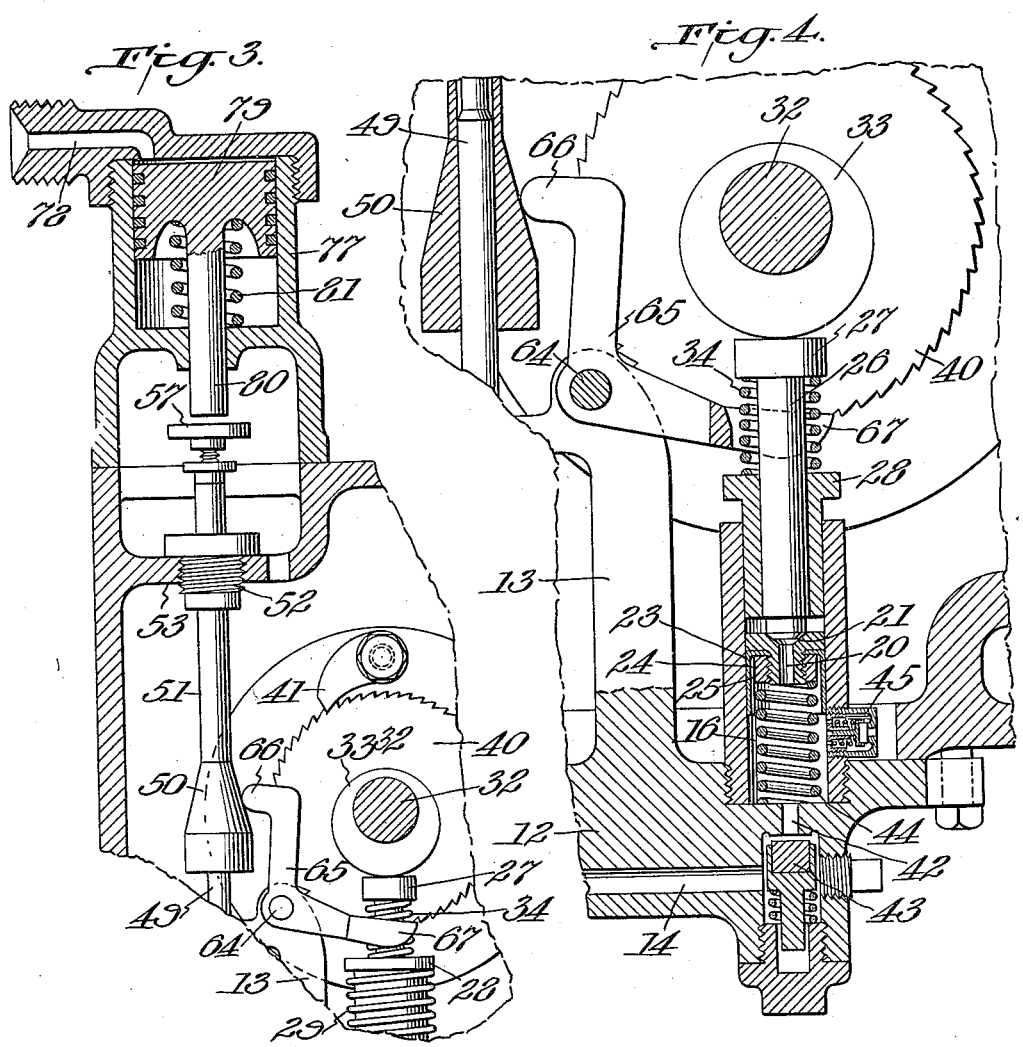
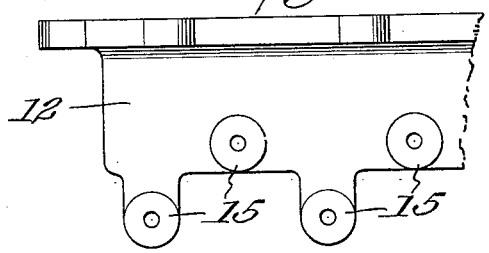
Inventors:
Frank William Edwards
Fordyce B. Farnsworth
by
Attorney.

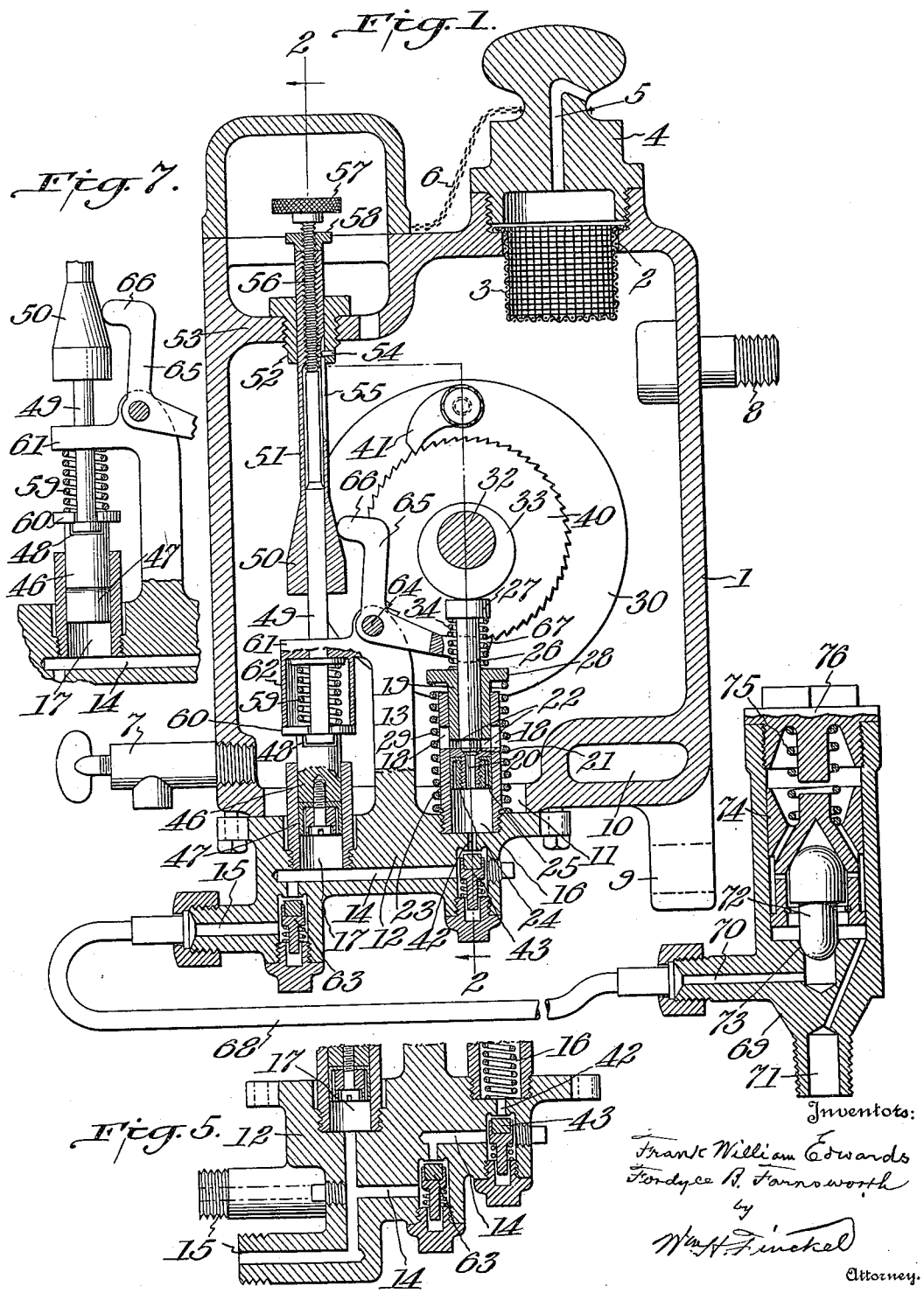

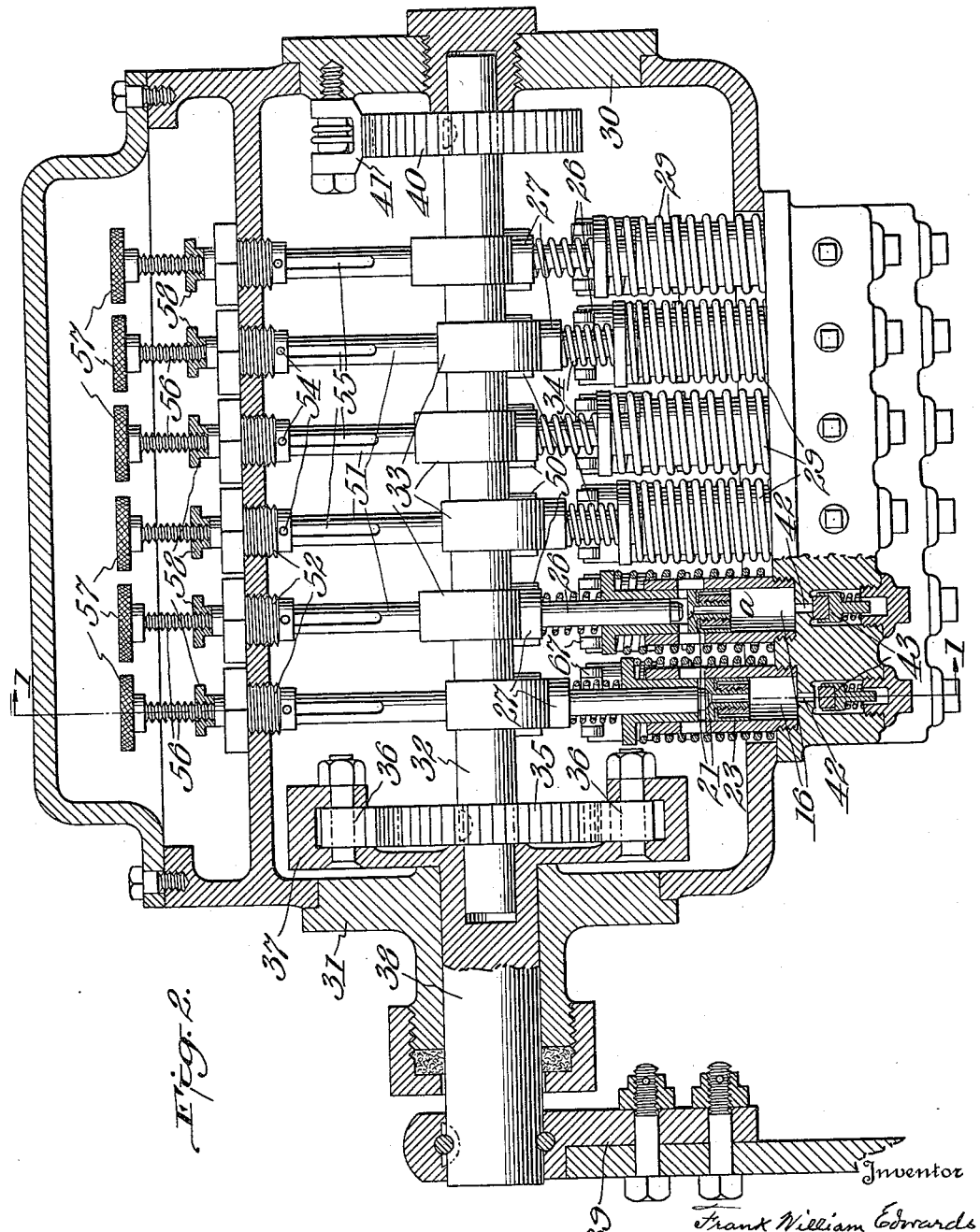

Patented Nov. 8, 1932

1,886,659

UNITED STATES PATENT OFFICE

FRANK WILLIAM EDWARDS, OF CHICAGO, ILLINOIS, AND FORDYCE B. FARNSWORTH, OF WADSWORTH, OHIO

LUBRICATOR

Application filed September 10, 1928. Serial No. 304,862.

The main object of the invention is to provide a mechanical force-feed lubricator so constructed and so operating as to supply lubricant to a point or points of delivery at a substantially constant, predetermined pressure, whereby changes in the quantities of lubricant delivered, or of its rate of flow to the parts to be lubricated, or loss of lubricant due to leakage or other causes may be compensated for, and an adequate supply of lubricant under requisite, predetermined pressure be present at all times during the operation of the lubricator and of the machine with which it is associated and to which it supplies lubricant.

To this end, the invention consists in a mechanical, force feed lubricator adapted to supply lubricant to one or more points of delivery, provided with a plunger or plungers mechanically operated to force the lubricant, under pressure, into channels leading to the points of delivery, and devices operative in response to the pressure of the lubricant in such channels for controlling the forcing effect of the plunger or plungers, whereby the variation in the pressure exerted by the plunger or plungers will be reflected in a constant pressure at the point or points of delivery, as we will proceed now to explain and finally claim.

In the accompanying drawings illustrating the invention, in the several figures of which like parts are similarly designated, Figure 1 is a transverse, vertical, sectional elevation taken on line 1—1 of Fig. 2, of a lubricator embodying our invention. Fig. 2 is a longitudinal, vertical, sectional elevation of same, taken on line 2—2 of Fig. 1. Fig. 3 is a fragmentary sectional elevation, similar to Fig. 1. illustrating means for manually controlling the plunger stroke adjusting devices. Fig. 4 is an enlarged fragmentary sectional elevation illustrating a modification of the forcing cylinder. Figs. 5 and 6 are, respectively, a transverse section and a front elevation, illustrating a modification of the arrangement of the lubricant ports in the pump unit block. Fig. 7 illustrates a modification of the control device.

We provide a lubricant reservoir body 1 having a filling opening 2 provided with a strainer 3 and a plug or stopper 4 having a vent opening 5 and preferably anchored to the body 1 by a chain or the like 6 to guard against its loss. A suitable drain cock 7 is arranged in the lower portion of the body. Lugs 8 and 9 afford a means by which the lubricator may be mounted upon a suitable support, or a part of the machine to which the device is to supply lubricant. A duct 10 provided with suitable connections, not shown, is adapted to receive steam for heating the lubricant and insuring its having the fluidity necessary for the proper functioning of the lubricator.

The bottom of the reservoir body 1 is provided with an opening 11 to which is fitted the pump unit block 12 carrying bearing brackets 13.

The block 12, as shown, is provided with a plurality of feed ducts 14 terminating in nipples 15, one for each feed delivery, and these ducts 14 and nipples 15 may be arranged either in line, as shown in Figs. 1 and 2, or staggered, as shown in Figs. 5 and 6.

In vertical alignment with each of the ducts 14 is arranged a forcing cylinder 16 and a control cylinder 17, screwthreaded or otherwise fixed in the block 12. Each of the forcing cylinders 16 is ported, as shown at 18, Fig. 1, and is provided with a hollow piston 19, closed at its bottom except for a bore 20 provided with a seat 21. The piston 19 has ports 22 adapted to register with the ports 18 of its cylinder.

To the bottom of each piston is applied a packing member in the form of a metallic cup 23, arranged to bear tightly in sliding contact with the inner wall of the cylinder, and attached to the piston by means of a nut 24 which fills the interior of the cup except for a slight annular space 25.

Slidably mounted within each of the pistons 19 is a forcing plunger 26, having its lower end shaped to form a valve adapted to contact with the seat 21, and its upper end headed, as at 27 to provide a cam follower.

As shown in Figs. 1 and 2, the pistons 19 are provided at their upper ends with flanges 28 between which and the block 12 are mounted compression springs 29 tending normally to move the pistons upward and hold the seats 21 in contact with the valve ends of the plungers 26, within certain limits, as hereinafter explained.

Mounted in suitable bearings 30 and 31 in the ends of the body 1 is a shaft 32 carrying a plurality of eccentrics 33, one of which is in vertical axial alignment with each of the cylinders 16 and forcing plungers 26. Compression springs 34 bearing against the flanges 28 of the pistons 19 and the heads 27 of the plungers cause the heads 27 to follow the contours of their respective eccentrics.

The shaft 32 is provided with a drive ratchet 35 engaged by drive pawls 36 carried by a yoke 37 preferably forming a part of a shaft 38 which may be driven through an arm 39 from any moving part of a machine, whereby an intermittent or step-by-step rotary motion is imparted to the yoke 37 and through its pawls 36 to the ratchet 35 and shaft 32 and the eccentrics on said shaft 32. At the opposite end of shaft 32 we mount a drag ratchet 40 engaged by a drag pawl 41 pivoted on the body 11.

Each of the cylinders 16 is in communication with its respective duct 14 through a port 42 controlled by a check valve 43.

Instead of the arrangement of the cylinders 16 ports 18 and springs 29, shown in Figs. 1 and 2, we may use the embodiment illustrated in Fig. 4, in which a spring 44 mounted within the cylinder and acting against the nut 24 is substituted for the spring 29, and a check-valve controlled opening 45 in the side of the cylinder supplies lubricant to the portion of the cylinder below the piston in response to the suction caused by the upward stroke of the piston under the influence of the spring 44.

Each of the control cylinders 17 is provided with a piston 46 having a packing cup 47 similar to the cups 23. And each of the pistons 46 is connected by means of a slip joint 48 with a rod 49 upon which is sleeved a cam member 50 the stem 51 of which is arranged for vertical sliding movement in a bearing member 52 mounted in a web 53 of the body 1. Rotation of the stem 51 within its bearing 52 is prevented by means of a pin and slot connection 54—55. The upper portion of each rod 49 is screwthreaded, as shown at 56, and is engaged by a complemental interior screwthread in the stem 51. A knurled head 57 is provided on the end of each of the rods 49 whereby the rod may be rotated to adjust its respective cam member 50 relatively to it by means of the screwthreaded engagement of these parts. This adjustment may be maintained by means of a suitable lock-nut 58.

The pistons 46 are normally forced into the cylinders 17 by springs 59 which bear against flanges 60 on the pistons and against the extensions 61 on the brackets 13. Upward movement of the pistons is limited by engagement of their flanges 60 with stop members 62 carried by the brackets 13.

As shown in Fig. 7, the stops 62 may be omitted, and when omitted upward movement of the pistons 46 will be limited by full compression of the springs 59 between the flanges 60 and extensions 61, for a purpose hereinafter more fully explained.

Check valves 63 supplement the action of the check valves 43, so that lubricant cannot be drawn out of the ducts 14 by the upward travel of the pistons 19 under the influence of the springs 29 or 44.

Pivotally supported in the brackets 13 by a rod, or a plurality of rods or pivot pins 64, is a plurality of bell-crank levers 65, one for each cylinder 16. Each of these levers has on one arm a cam contacting member 66 which rides against its respective cam 50, and on the end of its other arm there is a yoke 67 which straddles its respective plunger 26 and acts as a stop to limit upward movement of the corresponding piston 19 by cooperation with its flange 28.

By this combination of elements, it will be obvious that, the higher the cams 50 are raised and the lower the yokes 67 are consequently depressed, the shorter will be the stroke of the pistons 19 and, conversely, the lower the cams 50 and the higher the yokes 67, the longer will be the stroke of the pistons 19.

Obviously, where the arrangement of the control devices shown in Fig. 1 is used, the cams 50 cannot be raised so high and the yokes 67 so depressed that the upward stroke of the pistons 19 will be stopped at a point where the valve ends of the plungers 26 cannot contact with the seats 21 and impart a forcing stroke to them, and, therefore, with this arrangement the forcing cylinders 16 will always supply lubricant under pressure so long as the adjustment of the cams 50 relatively to their pistons 46 is properly maintained. But, with the arrangement of the control devices shown in Fig. 7, where no stops 62 are used, complete compression of the springs 59 will result in such an elevation of the cams 50 and such a consequent depression of the yokes 67 that no movement of the pistons 19 under the influence of their plungers 26 will take place, so long as the adjustment of the cams 50 relatively to their pistons 46 is properly maintained.

Each of the nipples 15 has connected to it a delivery pipe 68 (Fig. 1). These delivery pipes conduct the lubricant, under pressure, to the various parts to be lubricated. In order to insure the lubricant being delivered at a predetermined adequate pressure, we interpose in each delivery line a terminal valve, preferably of the type disclosed in the copending application of Frank W. Edwards, for patent for terminal valves for force feed lubricators, filed July 8, 1927, Serial No. 204,213, one form of which is indicated at 69 in Fig. 1. This valve has an inlet port 70 connected with the pipe 68, an outlet port 71 which may be connected to the point of delivery of the lubricant, and a check valve 72 forced to its seat at 73 by a plunger 74 actuated by a spring 75 which bears against the plunger and against a cap 76. This terminal valve may be adjusted to permit flow of lubricant past its check valve 72 at any predetermined pressure by the use of a spring 75 of requisite stiffness, and a fine adjustment may be obtained, if desired, by manipulation of the cap 76, though this latter is not ordinarily required.

By the incorporation of a terminal valve 69 in each of the delivery lines, it will be apparent that no lubricant can be delivered to the part to be lubricated unless it is supplied at a pressure equal to or in excess of that at which the terminal valve is adjusted to operate. Thus, if such valve is adjusted to operate at a pressure of 250 lbs., as might be the case where the delivery point is the steam pipe of a locomotive operating under approximately 250 lbs. steam pressure, or slightly less, the forcing plungers 26 and the pistons 19 actuated thereby would have to maintain in the delivery line connected with such terminal valve a pressure of 250 lbs. This is accomplished and regulated in a manner hereinafter fully explained.

At times it may be desirable to so adjust the positions of the cams 50 that any one or all of them may permit an increased or full stroke of the forcing pistons 19 at the will of the operator. This is possible by providing above each rod 49 or above those rods associated with certain particular feeds, a cylinder 77 (Fig. 3) connected through a passage 78 with a valved supply of fluid under pressure (preferably air or steam), such valve or valves being arranged within reach of the operator. Within each of the cylinders 77 is a piston 79 provided with a stem 80 adapted to engage the head 57 of the aligned rod 49.

These pistons are forced downward in the cylinders by the admission of the pressure fluid to the cylinders 77 and are returned to the position shown by springs 81. Obviously, when a piston 79 is depressed in response to operation, by the engineer or other operator, of the valve controlling admission of the pressure fluid to its cylinder, the stem 80 contacting with the head 57 of the rod 49 will depress said rod and the cam 50 carried by its respective sleeve 51, will permit the bell crank 65 to oscillate to raise the yoke 67, and will thus establish a full stroke of the piston 19 in that particular forcing cylinder 16. As soon as the piston 79 is permitted to ascend by exhausting pressure from its cylinder, the cam 50 will again assume its original position under the influence of its spring 59 and will be in condition for resumed automatic operation.

We will now describe the operation of our invention.

Assuming, for purposes of description of such operation, that the reservoir body 1 has been mounted on a suitable support on or in connection with a locomotive, by means of the members 8 and 9, its arm 39 connected with an appropriate motion imparting device, such as the valve rod of such locomotive, each of the feed pipes 68, with a terminal valve 69 applied thereto, connected with a part to be lubricated, the cams 50 properly adjusted, and the reservoir filled with lubricant, the lubricator will function as follows:—Upon starting of the motion imparting device connected with the arm 39, the shaft 32, by means of its pawl and ratchet connection with shaft 38, will be given an intermittent, or step-by-step, rotary motion, a similar motion being thereby imparted to the eccentrics 33. As shown at $a$ in Fig. 2, when the eccentrics 33 reach the position in which their low points are in engagement with the forcing plungers 26, the valve ends of the plungers will be raised or separated from their seats 21 in the pistons 19 and lubricant will pass through the ports 18 and 22 and through the bores 20 into the cylinders 16. This separation of the valve ends of the plungers and the seats 21 of the pistons is due to the fact that the plungers follow the contours of the eccentrics under the influence of the springs 34, whereas upward movement of the pistons 19 under the influence of springs 29 is arrested by the yokes 67 which are suitably adjusted by the cams 50 acting on bell cranks 65. Continued rotation of the shaft 32 and eccentrics 33 causes the forcing plungers 26 to descend and, in descending, to pick up the pistons 19 by engagement of the valve ends with seats 21, thus closing the bores 20 and forcing the pistons down into the cylinders 16. As the pistons are thus forced downward the lubricant trapped below them will exert pressure within the annular spaces 25 to force the cup-shaped packing member 23 into sealing contact with the inner walls of the cylinders 16, and the lubricant will be forced, under pressure, past the check valves 43 and into the ducts 14, and thence past check valves 63 into the delivery pipes 68 and terminal valves 69. Obviously, before the lubricant can pass check valves 63, it must fill the cylinders 17. For purposes of explanation, we will assume that the terminal valves 69 are adjusted to operate to pass the lubricant to the points of delivery at 250 lbs. pressure. This being the case, no lubrican will pass the terminal valves until a pressure of 250 lbs. has been established in the pipes 68, control cylinders 17 and ducts 14. Thus, until such pressure is attained, the pistons 46 will be in their lowest positions in the cylinders 17 under the influence of the springs 59, and the cams 50 will also be in their lowest positions as determined by their appropriate adjustment, for 250 lbs. pressure, upon the rods 49. The cams 50 being lowered, the yoke ends 67 of the bell cranks 65 will be in such position that a full stroke of the pistons 19 in the cylinders 16 will be possible. Under full stroke of these forcing pistons 19, the pipes 68 will be rapidly filled, and the pressure in these pipes and in the control cylinders 17 and ducts 14 will be rapidly raised until it reaches 250 lbs. When this pressure is reached the terminal valves 69 will pass lubricant to the parts to be lubricated. But, inasmuch as the feed of lubricant to such parts is much slower than the supply thereof effected by the forcing pistons 19, there will be a tendency toward an increase in pressure in the feed lines, control cylinders and ducts. As the pressure increases in the control cylinders, the pistons 46 will move upward, carrying with them the rods 49 and cams 50. As the cams 50 rise they will act upon the ends 66 of the bell crank levers 65 to lower the yoke ends 67 thereof and decrease the stroke of the forcing pistons 19 by limiting their upward movement. By thus decreasing the stroke of the forcing pistons 19, the pressure in the ducts 14, cylinders 17 and feed lines 68 will be lowered until it reaches 250 lbs. for which the cams 50 are adjusted. It will be apparent that, where the arrangement of control devices shown in Fig. 7 is used, the stroke of the pistons 19 may be reduced to zero, as hereinbefore explained, and the pressure in the ducts 14 will drop very rapidly. As the pressure in the ducts 14 and cylinder 17 is reduced the pistons 46 will descend, under the influence of the springs 59, and will carry the rods 49 and cams 50 with them to the point where resumed or continued operation of the pistons 19 maintains a pressure of 250 lbs. If the pressure drops below 250 lbs., due to leakage, increased consumption of lubricant at the points of delivery, or other causes, the stroke of the pistons 19 will be increased by readjustment of the cams 50 as reflected in the pressure acting upon the pistons 46, and if the pressure increases above 250 lbs., the stroke of the pistons 19 will be decreased by a corresponding readjustment of the cams 50 in response to rise of the pistons 46. It will thus be seen that the pressure, when once established in the delivery lines at a predetermined point, may be automatically maintained thereat by our device.

For purposes of a concrete illustration, we have described the operation of our device in connection with a locomotive. But it is to be understood that it is not so limited in its application but may be used in connection with any machine or machines so long as some means is provided for imparting movement to the arm 39.

Obviously, the terminal valves interposed in the several feed lines may be adjusted to deliver lubricant at different pressures, and the cams 50 controlling the established pressure in the lines leading to these terminal valves may be adjusted, by means of the threaded arrangement 56, to maintain such pressure. Each line may therefore be operated, if desired, at a pressure different from any other line, because each feed is distinct in its pressure control.

It will be understood, that where ports 18 and 22, as shown in Figs. 1 and 2, are used in the forcing cylinders 16 and their pistons 19, the adjustment of the yokes 67 will always be such that the seats 21 will be separated from the valve ends of the plungers 26, at the upper limit of movement of the pistons, so that the lubricant may flow through the ports 18 and 22 and bores 20 into the cylinders 16. However, where the arrangement shown in Fig. 4 is used, this is not necessary for the reason that the lubricant is introduced into the cylinders 16 below the pistons 19.

The modification of the arrangement of the ducts 14 and nipples 15, shown in Figs. 5 and 6, in no way affects the operative functions of the lubricator. By staggering the ducts and nipples as shown we facilitate the application of feed pipes 68 thereto, it being obvious that the staggered arrangement provides greater space between the nipples and facilitates the application and removal of the union nuts which connect the pipes 68 to the nipples.

Variations in the details of construction and the arrangement of parts are permissible within the principle of the invention and the scope of the claims following.

What we claim is:—

1. In a lubricator, a lubricant forcing cylinder, a forcing piston operating in said cylinder, means for operating said forcing piston, a control cylinder provided with a control piston, means providing a duct connecting said cylinders and to which said forcing cylinder supplies lubricant under pressure, means operable in response to movement of said control piston under the influence of pressures established in said duct by said forcing piston, including a lever arranged for variable adjustment relatively to said forcing piston for varying the effective stroke thereof, and a cam member movable in response to movement of said control piston and cooperating with said lever to vary the position thereof relatively to said forcing piston.

2. In a lubricator, a lubricant forcing cylinder, a forcing piston operating in said cylinder, means for operating said forcing piston, a control cylinder provided with a control piston, means providing a duct connecting said cylinders and to which said forcing cylinder supplies lubricant under pressure, means operable in response to movement of said control piston under the influence of pressures established in said duct by said forcing piston, including a lever arranged for variable adjustment relatively to said forcing piston for varying the effective stroke thereof, and a cam member movable in response to movement of said control piston and cooperating with said lever to vary the position thereof relatively to said forcing piston, said cam member being adjustable relatively to said control piston for varying the effect of movement of said control piston as reflected in movement of said lever.

3. In a lubricator, a lubricant forcing cylinder, a forcing piston therein, a forcing plunger associated with said piston, means for imparting forcing movement to said plunger and thereby to said piston, a control cylinder provided with a piston, means providing a duct communicating with said cylinders, and means including a member actuated by said control piston and cooperating with means for determining the stroke of said forcing piston independently of said forcing plunger operating means, whereby the forcing effect of said forcing piston is controlled in response to the pressure established in said duct and acting upon said control piston.

4. In a lubricator, a lubricant forcing cylinder, a forcing piston therein, a forcing plunger associated with said forcing piston, means for imparting movement to said plunger and thereby to said piston to accomplish the forcing stroke of said piston, means for imparting return stroke to said piston, a control cylinder provided with a control piston, means providing a duct affording communication between said cylinders and to which the forcing cylinder supplies lubricant under pressure, and means independent of the forcing plunger operating means and actuated by said control piston in response to variations in pressure in said duct for varying the forcing effect of said forcing piston, said means including a member adapted to vary the length of the return stroke of said forcing piston in response to movement of said control piston.

5. In a lubricator, a lubricant forcing cylinder provided with a forcing piston, a forcing plunger associated with said forcing piston and adapted to impart the forcing stroke to said piston, means including a rotary eccentric for imparting movement to said plunger, means for imparting return stroke to said forcing piston, a control cylinder, means providing a duct in communication with said forcing cylinder and said control cylinder, said control cylinder provided with a control piston, and means including a cam connected with said control piston and a lever movable in response to movement of said cam and associated with said forcing piston, said means adapted to limit the return stroke of said forcing piston to thereby vary the effective forcing action of said forcing cylinder in response to variations in pressure in said duct acting upon said control piston.

6. In a lubricator, a lubricant reservoir, a plurality of lubricant forcing cylinders associated with said reservoir and adapted to receive lubricant therefrom, a forcing piston in each of said forcing cylinders, a control cylinder provided with a control piston associated with each of said forcing cylinders, means providing a duct affording communication between each forcing cylinder and its associated control cylinder, common means for imparting forcing movement to all of said forcing pistons, means for imparting return movement to each of said pistons and separate means independent of said common means and actuated by each of said control pistons and cooperating with its respective forcing piston for limiting the return stroke thereof and thus varying the effective forcing action of said forcing pistons independently of each other in response to variations in the pressure in said ducts acting upon said control pistons, whereby each forcing cylinder and its associated control cylinder provides an independently controlled device for feeding lubricant under pressure.

7. In a lubricator, a plurality of lubricant forcing units, a control unit associated with each of said forcing units, means providing a duct affording communication between each forcing unit and its respective control unit and into which lubricant is supplied under pressure by the forcing unit, a lubricant delivery line connected with each duct and adapted to deliver lubricant under pressure to a point to be lubricated, a terminal valve adjusted for operation at a predetermined pressure interposed in each delivery line, and means actuated by each of said control units and acting upon its respective forcing unit under the influence of the pressure of lubricant in its communicating duct, whereby the forcing effect of each forcing unit may be so modified as to maintain in its respective feed line lubricant pressure corresponding to that at which its respective terminal valve is adjusted to operate.

8. In a lubricator, a forcing cylinder, a forcing piston operating therein, a forcing plunger associated with said piston, means including a rotary shaft and eccentric for imparting a forcing stroke to said plunger and therethrough to said piston, means for imparting return stroke to said piston, means for imparting return stroke to said plunger, a control cylinder, means providing a duct affording communication between said cylinders and to which lubricant is supplied under pressure by said forcing cylinder, a control piston in said control cylinder and movable therein in response to variations in pressure in said duct, a cam member adjustable relatively to said control piston, and a lever bearing against said cam and provided with means for limiting the return stroke of said forcing piston, whereby by adjustment of the stroke of said piston the forcing effect thereof under the influence of said plunger may be varied in response to movement of said control piston occasioned by variations in pressure in said duct.

9. In a lubricator, a forcing cylinder, a forcing piston operating therein and provided with an expansible metallic cup forming a packing therefor and in engagement with the walls of said cylinder, a forcing plunger associated with said piston, means including a rotary shaft and eccentric for imparting a forcing stroke to said plunger and therethrough to said piston, means for imparting return stroke to said piston, means for imparting return stroke to said plunger, a control cylinder, means providing a duct affording communication between said cylinders and to which lubricant is supplied under pressure by said forcing cylinder, a control piston in said control cylinder and movable therein in response to variations in pressure in said duct, a cam member adjustable relatively to said control piston, and a lever bearing against said cam and provided with means for limiting the return stroke of said forcing piston, whereby by adjustment of the stroke of said piston the forcing effect thereof under the influence of said plunger may be varied in response to movement of said control piston occasioned by variations in pressure in said duct.

10. In a lubricator, a forcing cylinder, a forcing piston operating therein and provided with an expansible metallic cup forming a packing therefor and in engagement with the walls of said cylinder, a forcing plunger associated with said piston, means including a rotary shaft and eccentric for imparting a forcing stroke to said plunger and therethrough to said piston, means for imparting return stroke to said piston, means for imparting return stroke to said plunger, a control cylinder, means providing a duct affording communication between said cylinders and to which lubricant is supplied under pressure by said forcing cylinder, a control piston in said control cylinder and movable therein in response to variations in pressure in said duct, said piston provided with a metallic packing cup similar to that of the forcing piston, a cam member adjustable relatively to said control piston, and a lever bearing against said cam and provided with means for limiting the return stroke of said forcing piston, whereby by adjustment of the stroke of said piston the forcing effect thereof under the influence of said plunger may be varied in response to movement of said control piston occasioned by variations in pressure in said duct.

11. In a lubricator, a lubricant forcing cylinder, a forcing piston operating in said cylinder, a control cylinder provided with a control piston, means for imparting a forcing stroke to said forcing piston, means establishing communication between said cylinders and to which said forcing cylinder supplies lubricant under pressure, means operable independently of said forcing stroke imparting means and including an adjustable member actuated by said control piston and means cooperating with said forcing piston, whereby the forcing effect of said forcing piston is controlled by controlling its return stroke in response to pressure in said communication establishing means and acting upon said control piston, and manually controlled fluid actuated means for moving said adjustable member to vary the forcing effect of said forcing piston at the will of the operator.

12. In a lubricator, a lubricant forcing cylinder provided with a forcing piston, a control cylinder provided with a control piston, means operable by the control piston for varying the stroke and thereby the forcing effect of the forcing piston and including a cam member movable in response to the movement of the control piston and a lever actuated by said cam member and interposed in the path of movement of said forcing piston, and manually operable means for varying the position of said cam member, whereby the forcing effect of said forcing piston may be varied at the will of the operator.

13. In a lubricator, a lubricant forcing cylinder provided with a forcing piston, a control cylinder provided with a control piston, means operable by the control piston for varying the stroke and thereby the forcing effect of the forcing piston and including a cam member movable in response to the movement of the control piston and a lever actuated by said cam member and interposed in the path of movement of said forcing piston, and manually operable means provided with a remote control for varying the position of said cam member, whereby the forcing effect of said forcing piston may be varied at the will of the operator.

14. In a lubricator, having a pipe leading therefrom to a point to be lubricated, means for rapidly filling such pipe with lubricant, including a forcing cylinder and piston, a control cylinder and piston, means affording communication between said forcing cylinder said control cylinder and said pipe, means for imparting a forcing stroke to said forcing piston, said control piston movable in its cylinder in response to variations in pressure therein, and a member interposed between said forcing piston and control piston and operable independently of the forcing stroke imparting means for regulating the effective forcing stroke of said forcing piston from its maximum to its minimum stroke in response to movement of said control piston as determined by change respectively from minimum to maximum pressure in said control cylinder, whereby in the absence of pressure in said pipe and hence in said communication affording means and said control cylinder said forcing piston will operate at maximum stroke.

15. In a lubricator, having a pipe leading therefrom to a point to be lubricated and a check valve arranged in said pipe adjacent to the point to be lubricated and adapted to pass lubricant at predetermined pressure, means for rapidly filling such pipe with lubricant to quickly establish such predetermined pressure therein, including a forcing cylinder and piston, a control cylinder and piston, means affording communication between said forcing cylinder said control cylinder and said pipe, means for imparting a forcing stroke to said forcing piston, said control piston movable in its cylinder in response to variations in pressure therein, and a member interposed between said forcing piston and control piston and operable independently of the forcing stroke imparting means for regulating the effective forcing stroke of said forcing piston from its maximum to its minimum stroke in response to movement of said control piston as determined by change respectively from minimum to maximum pressure in said control cylinder, whereby in the absence of pressure in said pipe and hence in said communication affording means and said control cylinder said forcing piston will operate at maximum stroke.

In testimony whereof I have hereunto set my hand this 7th day of September A. D. 1928.

FRANK WILLIAM EDWARDS.

In testimony whereof I have hereunto set my hand this 5th day of September A. D. 1928.

FORDYCE B. FARNSWORTH.